F. W. SMITH.

Paper-Boxes.

No. 5,855. Reissued April 28, 1874.

Witnesses
F. H. Adams
H. A. Smith

Inventor
Frederick W. Smith

UNITED STATES PATENT OFFICE.

FREDERICK W. SMITH, OF CHICAGO, ILLINOIS.

IMPROVEMENT IN PAPER BOXES.

Specification forming part of Letters Patent No. 147,697, dated February 17, 1874; reissue No. 5,855, dated April 28, 1874; application filed March 16, 1874.

*To all whom it may concern:*

Be it known that I, FREDERICK W. SMITH, of Chicago, State of Illinois, have invented an Improvement in Paper Boxes, of which the following is a specification:

My invention relates to the construction of small packages or boxes made of pasteboard, stiff paper, or wood, such as are generally used by grocers, coffee and spice mills, and others, for containing spices, coffee, baking-powder, and other articles.

Figure 2:
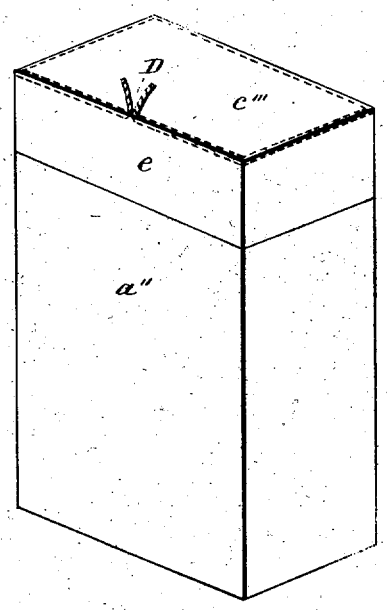

In the drawings, Figure 2 represents a box, with the cover attached. The cover consists of a single piece of pasteboard or wood, C‴, which sets upon the top of a box, A. Around the edges of the cover is placed a string or cord, as shown in dotted lines, and over the whole is pasted a piece of paper, *e*, extending down each side, as shown in Fig. 2. The ends of the cord project from one side, as shown at D. The cover is then firmly secured to the box, so as to hold the contents safely, admitting of transportation and handling of the box.

Figure 1:
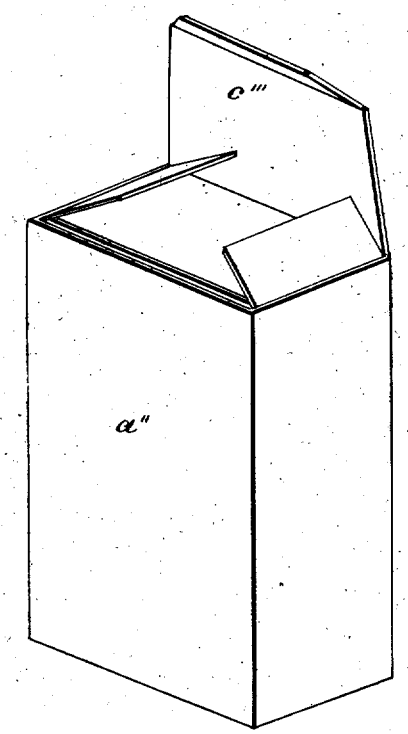

When it is desired to open the box the ends of the string are grasped, and by pulling the same the paper covering is severed at the edges and the lid can be raised. The string is intended to extend around three sides of the cover and box, so that in opening it one side may form a hinge to retain the cover upon the box, as shown in Fig. 1. One end of the string may protrude at a rear corner and extend around the box to the other rear corner, instead of protruding from the center of the front, as shown at D, Fig. 2. The box thus opened will remain a convenient receptacle for its contents, to be used as occasion may require for household use. The paper which secures the cover to the box may be a printed label to denote the contents, or the label which covers the sides of the box may be long enough to lap over on the top and secure the cover, and thus covering the string, which may protrude at one of the rear corners. These boxes or packages can be made very cheaply, and in the trade for which they are intended make a very convenient package for holding various articles of retail trade, at once convenient to the seller and the purchaser. Instead of the flat top the cover may extend over the sides in the ordinary manner, and the string secured under paper pasted around the lower edges of the cover.

I do not claim any particular form of box, as the cover may be attached in the manner above described to a round or square box, or any other shape. I do not claim the securing of the cover of a box to the body of a box by means of paper pasted over the edges unless it is done in combination with a cord or string arranged as and for the purpose I have described and set forth. I do not broadly claim tearing a paper by means of a cord or string, or the breaking of a seal by means of a cord or wire.

I am aware that envelopes have been opened by means of a cord arranged for that purpose; also, that the solder of tin cans has been cut by a wire. These I do not claim.

What I claim as my invention, and desire to secure by Letters Patent, is—

As a new article of manufacture, a paper box, the cover whereof is secured in a closed position on the body of the box by a thin paper covering-strip, which also confines on three sides of the upper edges or mouth of the body an opening-string, as described.

FREDERICK W. SMITH.

Witnesses:

H. A. SMITH,

F. H. ADAMS.